July 28, 1936.  T. E. LEVEL  2,049,209

DEVICE FOR THE SAFE LANDING OF AIR VEHICLES

Filed Feb. 5, 1934  2 Sheets—Sheet 1

WITNESS:

Carl E. Tucker

Harry M. Williams

Theodore E. Level

INVENTOR.

July 28, 1936.  T. E. LEVEL  2,049,209
DEVICE FOR THE SAFE LANDING OF AIR VEHICLES
Filed Feb. 5, 1934  2 Sheets-Sheet 2
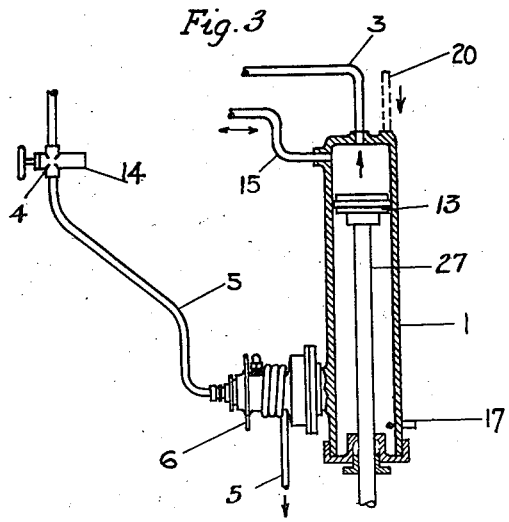
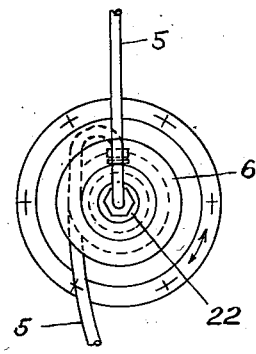
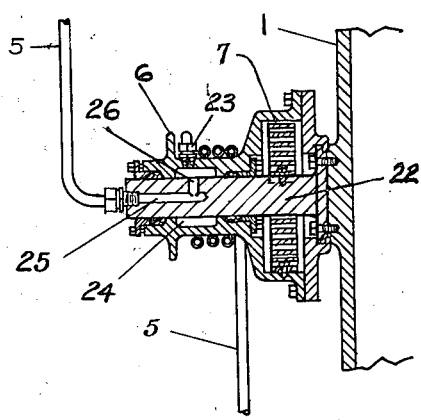
Theron E. Level INVENTOR.
Emil Kenhard
ATTORNEY.

Patented July 28, 1936

2,049,209

UNITED STATES PATENT OFFICE 2,049,209

DEVICE FOR THE SAFE LANDING OF AIR VEHICLES

Theodore E. Level, Niagara Falls, N. Y.

Application February 5, 1934, Serial No. 709,807

5 Claims. (Cl. 244—2)

My invention relates to means for safely landing aircrafts, more particularly herein referred to as air vehicles.

One of the objects of my invention is to permit the setting down of an air vehicle at a much sharper angle and at a greater landing speed, and at the same time absorbing the ground impact by means of shock-absorbing devices in the form of air compression cylinders; in utilizing the exhaust air from the air compression cylinders as a braking source, and in minimizing the hazards of forced landings and landings in fog or darkness; all being effected in a much smaller landing space than is now possible.

Another object of my invention is to provide the air vehicle with novel cushioning means, comprising a plurality of cylinders attached to the fuselage or body and having plunger pistons therein which are provided with extended piston rods connected to the landing gear of the vehicle; both the piston rods and their pistons, as well as the landing gear, being in fully extended position preparatory to landing, and serving to establish air-cushioning means between the fuselage and landing gear; and in providing means to discharge the compressed air, while landing, into atmospheric air, or into and through a novel compensating device to the brakes of the wheels of the landing gear, so as to bring the vehicle to a stop.

With these and other objects to appear hereinafter, my invention consists in the novel cushioning means interposed between the landing gear and the fuselage and in providing said landing gear with landing or traction wheels equipped with brakes and interposing between the cushioning devices and said brakes compensating mechanism which is included in the conduit connection between the two for the purpose of maintaining a simple, efficient, and positive connection even though the two elements connected are relatively movable and variously spaced at different times.

My invention also consists in the novel feature of construction and in the arrangement and combination of parts to be hereinafter described and more particularly pointed out in the subjoined claims.

In the drawings:

Fig. 3 is a sectional elevation of one of the air-cushioning cylinders, the pipes connected thereto and the self-winding hose reel carried thereby.

Fig. 4 is an end view of the self-winding hose reel showing the two sections of the hose connected thereto.

Fig. 5 is a central longitudinal section through the hose reel and its support.

Figure 1:
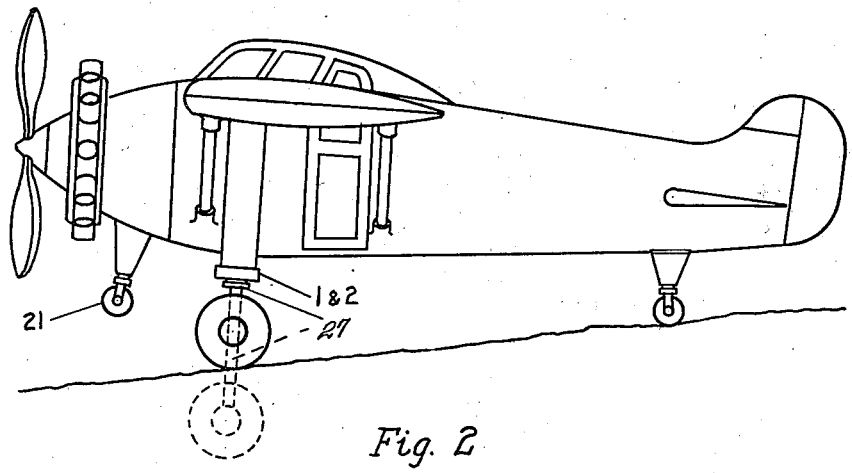
Fig. 1 is a side elevation of an air vehicle equipped with my invention.

Referring now to the drawings in detail, like numerals of reference refer to like parts in the several figures. In the drawings I have illustrated a common type of air vehicle or airplane. I have not designated the fuselage or the landing gears by numerals, since these parts will be understood upon examination of the drawings.

The air-cushioning medium comprises the cylinders 1 and 2 and the plunger pistons 13 therein. The cylinders are connected together by a pipe line 3, the pipe forming this line being threaded or otherwise connected to the upper ends of the cylinders 1 and 2 into which they open. In a branch of this pipe line which extends downwardly toward the landing gear, a three-way valve 4 is arranged, which valve is equipped with an air release 14 capable of adjustment to open at any desired pressure so as to permit the escape of the excess air pressure within said pipe line. The said pipe line 3 is connected with the operating elements 9, 10 applied to the brakes of the landing or traction wheels 11, 12 of the landing gear, said wheels being connected by the usual axle. A pipe line 15 connects the cylinders 1 and 2 and has a needle valve 16 therein which can be adjusted to discharge air compressed by the plunger pistons within said cylinders, through a vent 19. On the axle connecting the two wheels 11 and 12, I secure a cylinder 8 in which a double-action plunger piston is arranged, or two pistons having their effective strokes in opposite directions, and this cylinder has connection with the pipe line 3 through the medium of compensating mechanism designed to maintain connection between the two regardless of their relative positions without in any manner having loose or hanging parts. This compensating mechanism is in the form of a hose reel or drum 6 which is secured to one of the cylinders of the air-cushioning medium, and this hose reel may be termed a self-winding reel, due to the fact that in it is incorporated a spring 7 attached to the axle of the reel or drum and to the reel or drum for maintaining an air hose 5 in wound-up or coiled condition on the reel or drum, such air hose being formed in two sections, one of which has connection at one end with the downwardly-extending branch of the pipe line 3 and the other with a short pipe or nipple connected directly with the cylinder 8. Both sections of this air hose have connection with the hose reel or drum 6 which is shown rotatable on a shaft 22 fastened to the cylinder 1; that section of the hose having connection with the cylinder 8 being secured to the periphery of the hose reel, as shown at 23, and opening into the interior of said reel into an annular space 24 between the peripheral wall of said reel and the shaft 22. The other section of said hose is connected to an axial bore 25 in the shaft which has a lateral branch 26 opening into said annular space 24. Consequently, regardless of what degreed of rotation the reel may be given, connection is always maintained between the two sections of the hose, and due to the employment of the spring 7 within the reel the section of the hose wound around the reel is maintained in taut condition at all times.

The air-cushioning cylinders 1 and 2 are closed at the top and bottom and are provided at or near their lower ends with air vents 17, 18 respectively, and the plunger pistons have their rods slidable through stuffing boxes in the lower ends of said cylinders. It is to be noted that the plunger piston or pistons within the cylinder 8 secured to the axle of the landing gear have their piston rods 27 extending outwardly in opposite directions, and the outer ends of these rods are attached to the operating elements 9 and 10 of the brakes.

By preference the cylinders 1 and 2 are arranged at a slight angle forward in relation to the fuselage with the view of facilitating landing.

In Fig. 1 the landing gear is shown in full lines in "take-off" position, and in dotted lines in extended position preparatory to landing. Auxiliary wheels 21 are illustrated in this figure and these may be of similar construction to the wheels of the main landing gear. These may be placed in front or rear, or both in front and rear of the main landing gear, and can be of fixed, adjusted, or graduated compression.

Figure 2:
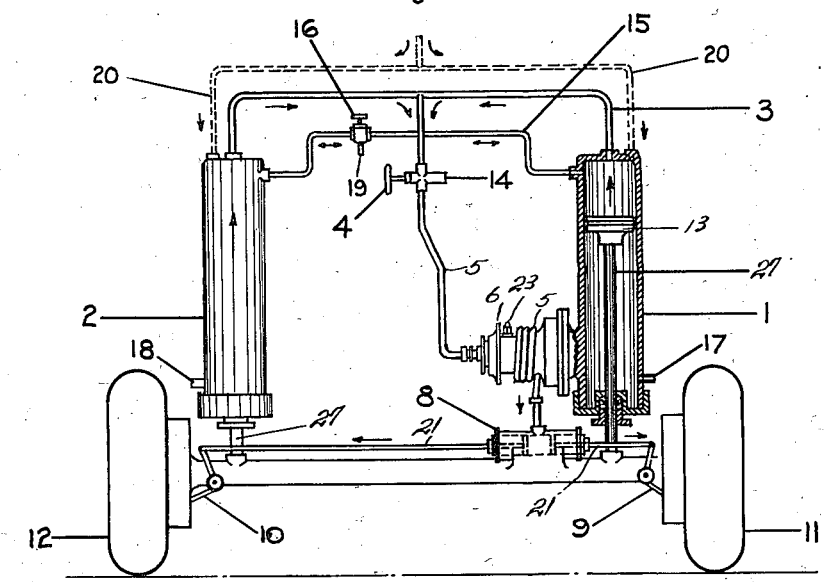
Fig. 2 is a sectional elevation of my improved cushioning medium, compensating mechanism, and landing gear in the form in which it is attached to the fuselage of an air vehicle and supports the weight of the latter while resting upon the wheels of the landing gear.

In Fig. 2 the cylinder 1 is shown in longitudinal section, the plunger piston being held in position near the top of the cylinder by the partial vacuum created due to the air valves being closed, and when the pistons of the two cylinders 1 and 2 are in this position, the landing gear is elevated or in "take-off" position.

The cylinders may also have connected thereto an auxiliary air pressure pipe 20, shown in dotted lines in Fig. 2. This pipe line may lead to a source of additional air pressure, for instance such as an air compressor operated from the motor of the air vehicle and supplied to an emergency tank and through the pipe line 20, from which tank compressed air can be released when found necessary and directed into the cylinders 1 and 2. Normally the plunger pistons are held in position at or near the upper ends of the cylinders 1 and 2 by the partial vacuum created when the air valves in the pipes 3 and 15 are closed, and since the landing gear is attached directly to the plunger rods of said plunger pistons, said landing gear will be maintained in its elevated or "take-off" position. It may here be stated that the air valves 4 and 16 may be operated from the operator's seat within the fuselage. Any common connection for this purpose, including levers, pedals, or the like, may be used.

Assuming the parts to be in the position illustrated in Fig. 2, and the vehicle traveling in the air preparatory to landing, the operator may actuate the levers, pedals, or other mediums employed for the purpose to open the air valves 4 and 16, which breaks the partial vacuum within the cylinders 1 and 2, and causes the landing gear to lower gently into fully extended position, as indicated by the dotted lines in Fig. 1. The valves 4 and 16 are then closed by reverse operation of the levers and/or pedals or other connecting elements employed between said valves and the fuselage and, if necessary, allowing compressed air from the emergency tank or other source to be released into the cylinders 1 and 2 through the pipe line 20.

As the wheels 11 and 12 come in contact with the ground, the air or other fluid employed within the cushioning cylinders 1 and 2 is compressed by the upward movements of the plunger pistons within said cylinders, caused by the impact of the wheels 11, 12 with the ground, and is released by action of the levers, pedals, or other controlling elements connected with the air valves 4 and 16. While the air within the cylinders 1 and 2 is compressed to a certain degree prior to the upward movement of the plunger pistons 13, such upward movement will result in a greater pressure of the air and this increased pressure on the valve 16 will result in the discharge of the air and allow the vehicle to coast after the air-cushioning means absorb the landing shock. As the pressure above the plunger pistons in the cylinders 1 and 2 and in the pipe lines 3 and 15 increases under the weight of the vehicle, due to the restricted discharge of this air through the needle valve 16, the valve 4 releases the compressed air into the air hose 5 connected to the cylinder 8 on the axle of the landing gear, and the plunger piston or pistons therein cause operation of the brakes 9 and 10, with the result that the ground speed of the vehicle is gradually retarded and the vehicle brought to a stop.

It may here be stated that the air-release 14, forming part of the three-way valve 4, is adjusted to discharge air when pressure is in excess of that desired to be directed into the air brake hose 5. It will also be apparent that when the landing gear is in normal or retracted position, the spring 7 of the hose reel or drum 6 causes the hose to be automatically coiled on said reel or drum, thus obviating the possibility of any portion of the hose hanging loosely from its support or connection; also that when the partial vacuum in the cushioning cylinders 1 and 2 is broken, the landing gear gravitates into its extended position. The hose reel will unwind against the action of the spring with the lowering of the landing gear and pay out the hose to compensate for the increased distance between the end of the pipe line 3 to which it is connected and the cylinder 8. The assemblage and co-relation of the parts shown and described provides a compact cushioned landing gear wherein simple means of utilizing excess or waste air to operate the brakes of the landing gear is included.

Although in the representative form of my invention shown in the drawings I have illustrated air cylinders and made provision for supplying auxiliary air thereto, it is to be understood that it is within the province of my invention to substitute hydraulic cylinders for the air cylinders, which may also be referred to as air chambers, since they will perform the same functions as the air cylinders herein described; and therefore, where, in the claims, the term air-compression chambers or cylinders is employed, it is intended that it be construed to include chambers or cylinders in which any other fluids are used.

While I have illustrated my invention in a representative manner, variations in parts and in the manner of assembling the same may be resorted to without departing from the scope of my invention as set out in the accompanying claims.

Having thus described my invention, what I claim is:

1. The combination with a fuselage, of a landing gear, a plurality of air compression cylinders secured to said fuselage and having pistons therein connected to said landing gear, said landing gear including landing wheels and brakes therefor, air-operated means carried by said landing gear and connected with said brakes to operate the same, a conduit connection between said air compression cylinders having connection with said air-operated means, and a valve in said connection to simultaneously control the exhausting of air from said cylinders and the feeding of air to said air-operated means.

2. The combination with a fuselage, of a landing gear, a plurality of air compression chambers secured to said fuselage and having pistons therein connected to said landing gear, said landing gear including landing wheels and brakes therefor, air-operated means carried by said landing gear and connected with said brakes to operate the same, a conduit connection between said air compression cylinders and said air-operated means including a valve equipped with an air release for the discharge of compressed air into atmospheric air and with means to direct excess air pressure into said air-operated means.

3. The combination with a fuselage, of a landing gear, a plurality of air compression chambers secured to said fuselage and having pistons therein connected to said landing gear, said landing gear including landing wheels and brake mechanism, an air cylinder carried by said landing gear and having a plunger piston therein connected with said brake mechanism, conduit connection between at least one of said air compression cylinders and the cylinder of said landing gear, and means within said conduit connection for controlling the exhausting of air from said last-mentioned cylinder and the pressure of the air from said conduit connection to the air cylinder of said landing gear.

4. The combination with a fuselage, of air compression cylinders secured thereto having pistons therein connected to said landing gear, said landing gear including brake mechanism and an air-operated device in connection with said brake mechanism, a conduit connection between said cylinders having a manually-operated valve to release air from said air compression cylinders under the compression strokes of the pistons therein, a conduit connection between said air compression cylinders and the air-operated device of said landing gear, said last-mentioned conduit connection having a manually-controlled valve controlling the release of compressed air therefrom to atmospheric air and the passage of compressed air to said air-operated device.

5. In an air vehicle, the combination with a fuselage, of a pair of air cylinders secured to said fuselage having plunger pistons therein and piston rods extending downwardly from said plunger pistons through the lower ends of said air cylinders, a landing gear having an axle to which said piston rods are connected, landing wheels rotatable on said axle and including brakes, an air cylinder carried by said axle and having pistons therein, operative connection between said pistons and said brakes, conduit connection between the upper ends of said air compression cylinders and the air cylinder on said axle including a flexible portion, a spring-controlled reel secured to one of said cylinders and having the flexible portion of said conduit connection wound around the same, and means in said conduit connection under manual control for allowing air exhausted from said air compression cylinders to discharge into atmospheric air and to allow any excess pressure to be directed into the air cylinder on said axle.

THEODORE E. LEVEL.